United States Patent
Patel et al.

(10) Patent No.: US 11,431,649 B1
(45) Date of Patent: Aug. 30, 2022

(54) INTERCONNECT RESOURCE ALLOCATION

(71) Applicant: Arm Limited, Cambridge (GB)

(72) Inventors: Mukesh Patel, Round Rock, TX (US); Jamshed Jalal, Austin, TX (US); Gurunath Ramagiri, Austin, TX (US); Tushar P Ringe, Austin, TX (US); Mark David Werkheiser, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/214,028

(22) Filed: Mar. 26, 2021

(51) Int. Cl.
*G06F 13/20* (2006.01)
*G06F 13/42* (2006.01)
*G06F 12/0888* (2016.01)
*G06F 15/173* (2006.01)
*H04L 47/80* (2022.01)
*H04L 47/78* (2022.01)
*H04L 47/62* (2022.01)
*H04L 47/762* (2022.01)

(52) U.S. Cl.
CPC ........ *H04L 47/805* (2013.01); *H04L 47/6225* (2013.01); *H04L 47/762* (2013.01); *H04L 47/782* (2013.01); *H04L 47/801* (2013.01)

(58) Field of Classification Search
CPC ... H04L 47/805; H04L 47/6225; H04L 47/62; H04L 47/782; H04L 47/80
See application file for complete search history.

(56) References Cited

U.S. PATENT DOCUMENTS

| | | | |
|---|---|---|---|
| 2002/0143939 A1* | 10/2002 | Riddle | H04L 47/10 709/224 |
| 2014/0115268 A1* | 4/2014 | Beers | G06F 12/0831 711/146 |
| 2017/0091108 A1* | 3/2017 | Arellano | G06F 13/4282 |
| 2020/0301854 A1* | 9/2020 | Ramagiri | G06F 12/0833 |
| 2020/0356502 A1* | 11/2020 | Safranek | G06F 13/4291 |
| 2021/0092068 A1* | 3/2021 | Ismailsheriff | H04L 47/2441 |

* cited by examiner

*Primary Examiner* — Christopher B Robinson
(74) *Attorney, Agent, or Firm* — Leveque Intellectual Property Law, P.C.

(57) ABSTRACT

The present disclosure advantageously provides a method and system for allocating shared resources for an interconnect. A request is received at a home node from a request node over an interconnect, where the request represents a beginning of a transaction with a resource in communication with the home node, and the request has a traffic class defined by a user-configurable mapping based on one or more transaction attributes. The traffic class of the request is determined. A resource capability for the traffic class is determined based on user configurable traffic class-based resource capability data. Whether a home node transaction table has an available entry for the request is determined based on the resource capability for the traffic class.

20 Claims, 12 Drawing Sheets

310

| QoS | Class |
|---|---|
| 0 – 7 | 0 |
| 8 – 11 | 1 |
| 12 – 14 | 2 |
| 15 | 3 |

320

| Opcode | Class |
|---|---|
| Read | 0 |
| CopyBack | 1 |
| Non-CopyBack | 2 |
| Dataless/CMO | 3 |

330

| MPAM | Class |
|---|---|
| 0 – 31 | 0 |
| 32 – 63 | 1 |
| 64 – 127 | 2 |
| 128 – 511 | 3 |

Table (Classes 0-23):

| QoS | Opcode | MPAM | Class |
|---|---|---|---|
| 0 | 0 | 0 | 0 |
| 0 | 0 | 1 | 1 |
| 0 | 0 | 2 | 2 |
| 0 | 0 | 3 | 3 |
| 0 | 1 | 0 | 4 |
| 0 | 1 | 1 | 5 |
| 0 | 1 | 2 | 6 |
| 0 | 1 | 3 | 7 |
| 0 | 2 | 0 | 8 |
| 0 | 2 | 1 | 9 |
| 0 | 2 | 2 | 10 |
| 0 | 2 | 3 | 11 |
| 0 | 3 | 0 | 12 |
| 0 | 3 | 1 | 13 |
| 0 | 3 | 2 | 14 |
| 0 | 3 | 3 | 15 |
| 1 | 0 | 0 | 16 |
| 1 | 0 | 1 | 17 |
| 1 | 0 | 2 | 18 |
| 1 | 0 | 3 | 19 |
| 1 | 1 | 0 | 20 |
| 1 | 1 | 1 | 21 |
| 1 | 1 | 2 | 22 |
| 1 | 1 | 3 | 23 |

Table (Classes 24-39):

| QoS | Opcode | MPAM | Class |
|---|---|---|---|
| 1 | 2 | 0 | 24 |
| 1 | 2 | 1 | 25 |
| 1 | 2 | 2 | 26 |
| 1 | 2 | 3 | 27 |
| 1 | 3 | 0 | 28 |
| 1 | 3 | 1 | 29 |
| 1 | 3 | 2 | 30 |
| 1 | 3 | 3 | 31 |
| 2 | 0 | 0 | 32 |
| 2 | 0 | 1 | 33 |
| 2 | 0 | 2 | 34 |
| 2 | 0 | 3 | 35 |
| 2 | 1 | 0 | 36 |
| 2 | 1 | 1 | 37 |
| 2 | 1 | 2 | 38 |
| 2 | 1 | 3 | 39 |

Table (Classes 40-63):

| QoS | Opcode | MPAM | Class |
|---|---|---|---|
| 2 | 2 | 0 | 40 |
| 2 | 2 | 1 | 41 |
| 2 | 2 | 2 | 42 |
| 2 | 2 | 3 | 43 |
| 2 | 3 | 0 | 44 |
| 2 | 3 | 1 | 45 |
| 2 | 3 | 2 | 46 |
| 2 | 3 | 3 | 47 |
| 3 | 0 | 0 | 48 |
| 3 | 0 | 1 | 49 |
| 3 | 0 | 2 | 50 |
| 3 | 0 | 3 | 51 |
| 3 | 1 | 0 | 52 |
| 3 | 1 | 1 | 53 |
| 3 | 1 | 2 | 54 |
| 3 | 1 | 3 | 55 |
| 3 | 2 | 0 | 56 |
| 3 | 2 | 1 | 57 |
| 3 | 2 | 2 | 58 |
| 3 | 2 | 3 | 59 |
| 3 | 3 | 0 | 60 |
| 3 | 3 | 1 | 61 |
| 3 | 3 | 2 | 62 |
| 3 | 3 | 3 | 63 |

FIG. 4B

INTERCONNECT RESOURCE ALLOCATION

BACKGROUND

The present disclosure relates to a data processing system. More particularly, the present disclosure relates to resource allocation for a data processing system.

A data processing system may be arranged as a system-on-chip (SoC) that includes various components that are connected by an interconnect. Generally, certain components process data, such as, for example, processors, processor clusters, graphic processors, etc., while other components send data to, and receive data from, the data processing components, such as, for example, memory controllers, etc. The data provisioning components may be connected to on-chip or off-chip memory, data buses, wired or wireless networks, etc. The interconnect provides the network infrastructure over which data transactions between components are conveyed.

An interconnect may implement packet-based communication with a request-response-retry message protocol. Generally, a requester is a component that initiates transactions by sending requests for resources over the interconnect, and a completer is a component that manages a particular resource, services requests for that resource and sends responses to requesters over the interconnect. A requester, such as a processor, may originate the transaction, or a master device that is connected to a requester may originate the transaction, such as a peripheral component interconnect express (PCIe) master device.

If a completer is busy and cannot service a request, the completer sends a retry response to the requestor. The requester then waits until a credit grant is received from the completer, which indicates that the completer is now able to service the request. The requester then sends a retried request to the completer, which services the request by sending the request to the slave device, such as a memory controller, to access data from the resource, such as memory. Other completers may service the request locally, i.e., without communicating with a slave device. Similarly, the completer and the resource follow the same retry and credit grant protocol if the resource is busy.

In many systems, resources are allocated to requesters based on a fixed resource allocation scheme that is not dynamically adjustable. However, creating a fixed resource allocation scheme that satisfies each requester's resource requirements, while optimizing overall resource usage, is an intractable problem that is exacerbated when resource requirements fluctuate based on requester workload and other dynamic considerations.

BRIEF DESCRIPTION OF THE DRAWINGS

FIG. 4A depicts several traffic class mappings for an interconnect, in accordance with embodiments of the present disclosure.

FIG. 4B depicts a hierarchical traffic class mapping for an interconnect, in accordance with an embodiment of the present disclosure.

DETAILED DESCRIPTION

Figure 1:
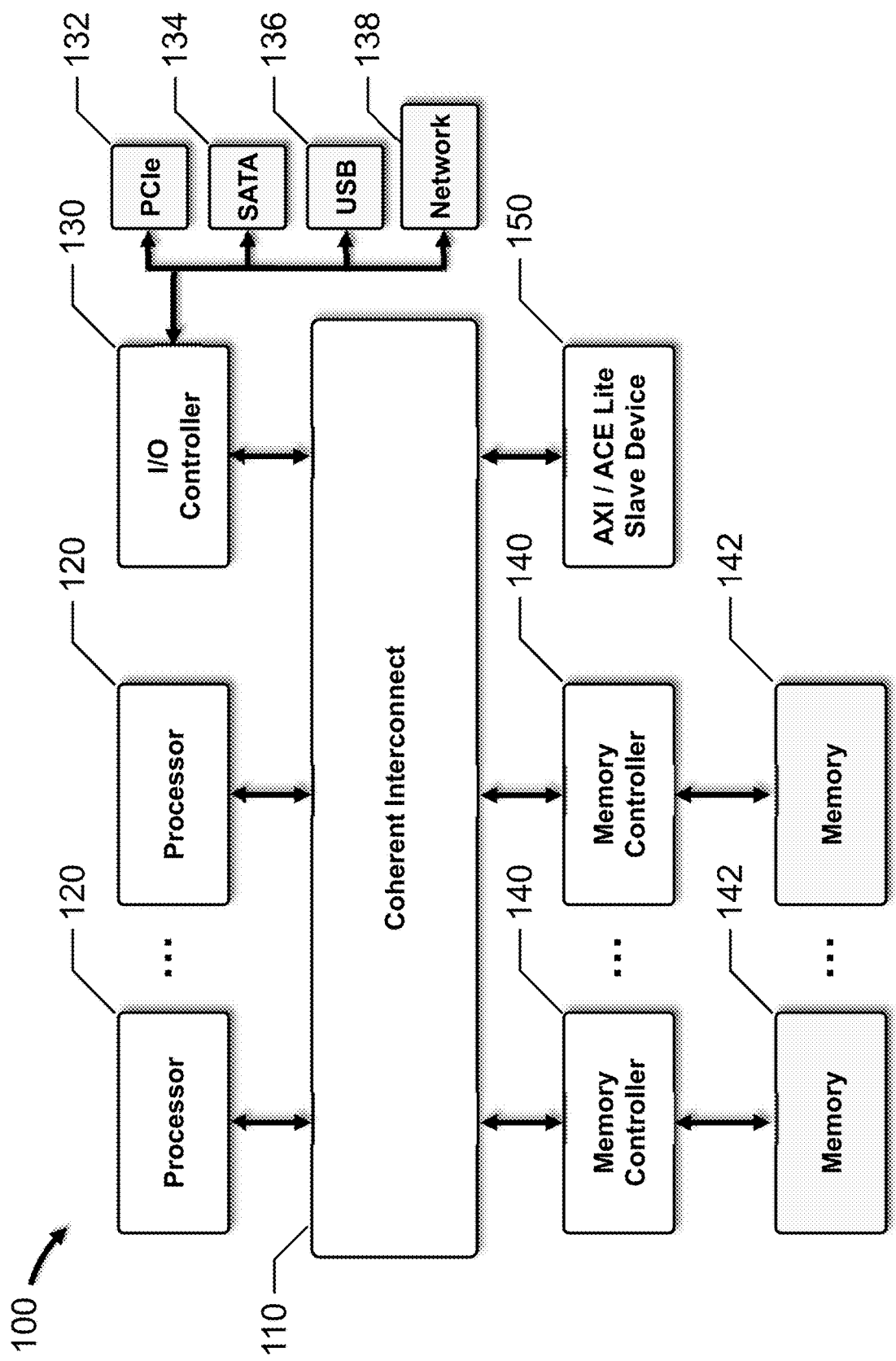
FIG. 1 depicts a block diagram for a SoC, in accordance with an embodiment of the present disclosure.

Embodiments of the present disclosure will now be described with reference to the drawing figures, in which like reference numerals refer to like parts throughout.

Interconnect resource allocation schemes typically rely on a pre-specified, traffic type definition, such as, for example, quality of service (QoS), operation codes (i.e., Opcodes) as READ, COPYBACK, NON-COPYBACK, etc. Such schemes assume that QoS, Opcodes, etc., are a generally defined metric for performance, and the completer includes hard-wired logic for different definitions of these traffic types. Such systems are simply not flexible enough to meet the needs of systems with varying requester workloads where the traffic type definition may be loosely-constrained.

Additionally, interconnect resource allocation schemes are fixed, and rely on allocating resources to different traffic types in advance of operation. This results in resource under-utilization when a particular traffic type is not being requested in accordance with its allocated resources, and a lack of configurability if a user desires to modify the resource allocation (e.g., shape the bandwidth distribution) under different traffic type contention scenarios.

Embodiments of the present disclosure advantageously provide configurable multi-tiered interconnect resource allocation that satisfies each requester's requirements while optimizing overall system resource usage under different requester workload and contention scenarios.

In one embodiment, a method for allocating shared resources for an interconnect includes receiving, at a home node, a request from a request node over an interconnect, the request representing a beginning of a transaction with a resource in communication with the home node, the request having a traffic class defined by a user-configurable mapping based on one or more transaction attributes; determining the traffic class of the request; determining a resource capability for the traffic class based on user configurable traffic class-based resource capability data; and determining whether a home node transaction table has an available entry for the request based on the resource capability for the traffic class.

FIG. 1 depicts a block diagram for a SoC, in accordance with an embodiment of the present disclosure.

Generally, SoC 100 includes interconnect 110, processors 120, I/O controller 130, memory controllers 140, an Advanced eXtensible Interface (AXI) or AXI coherency extensions (ACE) Lite slave device 150, etc.

Interconnect 110 is a communication system that transfers data between processors 120, I/O controller 130, memory controllers 140 and AXI/ACE Lite slave device 150, as well as other components (not depicted for clarity). Each component of SoC 100 that is coupled to interconnect 110 is a requester, a completer or a slave, and is classified as a particular type of interconnect protocol node, as discussed in more detail with respect to FIG. 2.

Generally, interconnect 110 may include, inter alia, a shared or hierarchical bus, a crossbar switch, a packet-based serialized network-on-chip (NoC), etc. Interconnect 111, depicted in FIG. 3A, has a crossbar topology that provides an ordered network with low latency, and may be particularly suitable for a small-sized interconnect with a small number of protocol nodes, switches and wire counts. Interconnect 112, depicted in FIG. 3B, has a ring topology that balances wiring efficiency with latency, which increases linearly with the number of protocol nodes, and may be particularly suitable for a medium-sized interconnect. Interconnect 113, depicted in FIG. 3C, has a mesh topology that has more wires to provide greater bandwidth, is modular and easily scalable by adding more rows and columns of switches or routers, and may be particularly suitable for a large-sized interconnect.

In many embodiments, interconnect 110 is a coherent mesh network that includes multiple switches or router logic modules (routers) arranged in a two-dimensional rectangular mesh topology, such as, for example, the Arm CoreLink Coherent Mesh Network. In this example, the switches or routers are crosspoints (i.e., XPs). Each XP may connect up to four neighboring XPs using mesh ports, and may connect to one or two components (devices) using device ports. Additionally, each XP may support four coherent hub interface (CHI) channels to transport data from a source device to a destination or target device, as described, for example, in the Arm Advanced Microcontroller Bus Architecture 5 (AMBA 5) CHI specification.

In these embodiments, interconnect 110 may have an architecture that includes three layers, i.e., an upper protocol layer, a middle network layer, and a lower link layer. The protocol layer generates and processes requests and responses at the protocol nodes, defines the permitted cache state transitions at the protocol nodes that include caches, defines the transaction flows for each request type, and manages the protocol level flow control. The network layer packetizes the protocol message, determines, and adds to the packet, the source and target node IDs required to route the packet over interconnect 110 to the required destination. The link layer provides flow control between components, and manages link channels to provide deadlock free switching across interconnect 110.

Processors 120 may include one or more general-purpose, central processing units (CPUs) that execute instructions to perform various functions for SoC 100, such as, for example, control, computation, input/output, etc. More particularly, processor 120 may include a single processor core or multiple processor cores, which may be arranged in a processor cluster, such as, for example the Arm Cortex A, R and M families of processors. Generally, processor 120 may execute computer programs or modules, such as an operating system, application software, other software modules, etc., stored within a memory, such as, for example, memory 142.

Processors 120 may also include one or more specialized processors that are optimized to perform a specific function, such as process graphics, images and/or multimedia data, process digital signal data, process artificial neural network data, etc. For example, processor 120 may be a graphics processing unit (GPU), a digital signal processor (DSP), a neural processing unit (NPU), etc. More particularly, special processor 120 may include a single processor core or multiple processor cores, such as, for example the Arm Mali family of GPUs, display processors and video processors, the Arm Machine Learning processor, etc.

Processors 120 may also include local cache memory.

I/O controller 130 includes a microprocessor, microcontroller, application specific integrated circuit (ASIC), field programmable gate array (FPGA), etc., and is configured to transmit data to and from various networks or communication buses using wired and/or wireless connections, including, for example, peripheral component interface express (PCIe) bus 132, serial advanced technology attachment (SATA) bus 134, universal serial bus (USB) 136, network 138, etc. Network 138 may include one or more local area networks, wide area networks, the Internet, etc., which may execute various network protocols, such as, for example, wired and/or wireless Ethernet, Bluetooth, etc. Network 138 may also include various combinations of wired and/or wireless physical layers, such as, for example, copper wire or coaxial cable networks, fiber optic networks, Bluetooth wireless networks, WiFi wireless networks, CDMA, FDMA and TDMA cellular wireless networks, etc. In certain embodiments, I/O controller 130 is a system memory management unit (SMMU), such as, for example, the Arm CoreLink MMU family. In other embodiments, I/O controller or bridge 130 includes an Arm CoreLink MMU, which is coupled to PCIe bus 132 and network 138, and an Arm CoreLink Network Interconnect (NIC), which is coupled to SATA bus 134 and USB 136.

Memory controllers 140 include a microprocessor, microcontroller, application specific integrated circuit (ASIC), field programmable gate array (FPGA), etc., and are configured to provide access to memory 142 through interconnect 110. Memory 142 may include a variety of non-transitory computer-readable medium that may be accessed by the other components of SoC 100, such as processors 120, I/O controller 130, etc. For example, memory 142 may store data and instructions for execution by processor 120, etc. In various embodiments, memory 142 may include volatile and nonvolatile medium, non-removable medium and/or removable medium. For example, memory 142 may include any combination of random access memory (RAM), dynamic RAM (DRAM), double data rate (DDR) DRAM or synchronous DRAM (SDRAM), static RAM (SRAM), read only memory (ROM), flash memory, cache memory, and/or any other type of non-transitory computer-readable medium. In certain embodiments, memory controllers 140 are dynamic memory controllers that provides data transfers to and from high-density DDR3 or DDR4 DRAM memory, such as, for example, the Arm CoreLink Dynamic Memory Controller (DMC) family, each of which includes a fast, single-port CHI channel interface for connecting to interconnect 110.

Generally, AXI/ACE Lite slave device 150 is a memory or memory-mapped device that includes a microprocessor, microcontroller, application specific integrated circuit (ASIC), field programmable gate array (FPGA), etc., that is configured to transmit and/or receive data. In certain embodiments, AXI/ACE Lite slave device 150 is a peripheral, and in other embodiments, AXI/ACE Lite slave device 150 is a memory.

Figure 2:
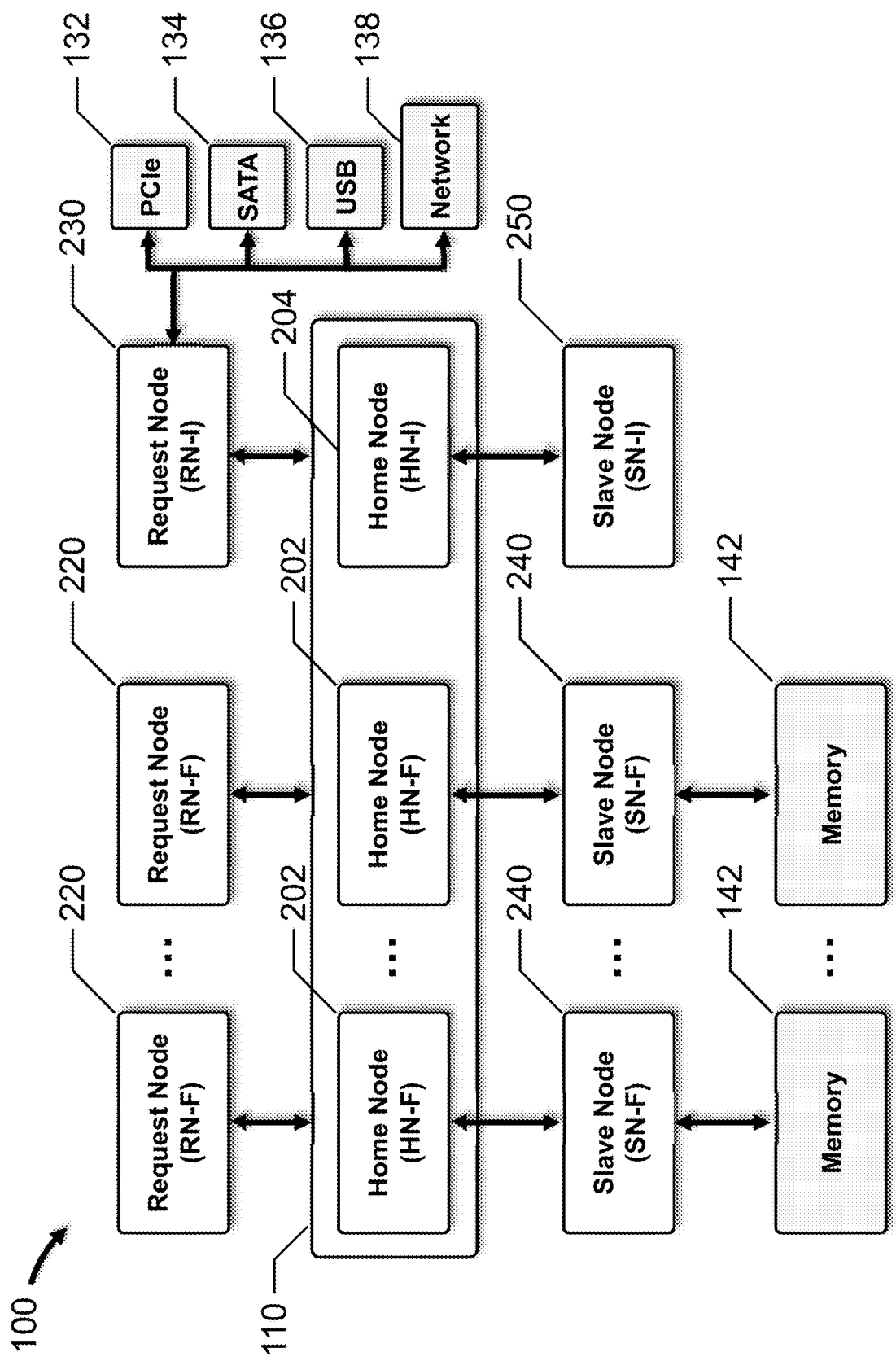
FIG. 2 depicts a block diagram for the SoC using protocol node nomenclature, in accordance with an embodiment of the present disclosure.

FIG. 2 depicts a block diagram for the SoC using protocol node nomenclature, in accordance with an embodiment of the present disclosure.

A requester is represented by a Request Node (RN), which is a protocol node that generates protocol transactions for interconnect 110, such as, for example, memory reads and writes, I/O data transfers, etc. An RN-F protocol node represents "fully" a coherent requester, and an RN-I protocol node represents an "I/O" coherent requester. Processors 120 are fully coherent requesters, and each RN-F 220 represents one processor 120. I/O controller 130 is an I/O coherent requester, so RN-I 230 represents I/O controller 130. In this embodiment, RN-I 230 acts as a bridge or proxy for one of more master devices connected to it through PCIe bus 132, as well as SATA bus 134, USB 136, network 138, etc.

In this embodiment, interconnect 110 includes several completers, each including a processor, microprocessor, microcontroller, application specific integrated circuit (ASIC), field programmable gate array (FPGA), logic circuits, etc., to provide the relevant functionality. Each completer is represented by a Home Node (HN), which is a protocol node that receives protocol transactions from RNs (and SNs described below). Each HN is responsible for managing a specific portion of the overall address space for SoC 100. Similar to RNs, an HN-F protocol node represents a "fully" coherent completer or HN, and an HN-I protocol node represents an "I/O" coherent completer or HN.

In many embodiments, each HN-F manages a particular portion of the address space of memories 142. Each HN-F may include a system level cache and a snoop traffic filter, and acts as the Point-of-Coherency (PoC) and Point of Serialization (PoS) for the memory requests sent to that HN-F. To avoid conflicts when multiple RN-Fs attempt to access the same memory address, each HN-F 202 acts as the PoS for the associated SN-F 240, processing read requests, write requests, etc., in a serial manner. Each HN-I is responsible for managing all of the transactions targeting the address space of a particular slave device or subsystem. In many embodiments, each HN-I may contain an ACE Lite master port to send bus transactions to one or more AXI or ACE-Lite slave devices through an Advanced Microcontroller Bus Architecture (AMBA) connection. In certain embodiments, AXI/ACE Lite slave device 150 is connected to HN-I 204 through an AMBA connection.

A slave is represented by a Slave Node (SN), which is a protocol node that receives and completes requests from the HN-Fs and HN-Is. Similar to RNs, an SN-F protocol node represents a "fully" coherent slave, and an SN-I protocol node represents an "I/O" coherent slave. Memory controllers 140 are slave devices, and are represented as SN-Fs 240. Each HN-F 202 is associated with one SN-F 240. AXI/ACE Lite slave device 150 is also a slave device, and is represented by SN-I 250. HN-I 204 is associated with SN-I 250.

As discussed above, FIGS. 3A, 3B and 3C depict different topologies for interconnect 110, in accordance with embodiments of the present disclosure.

Figure 3A:
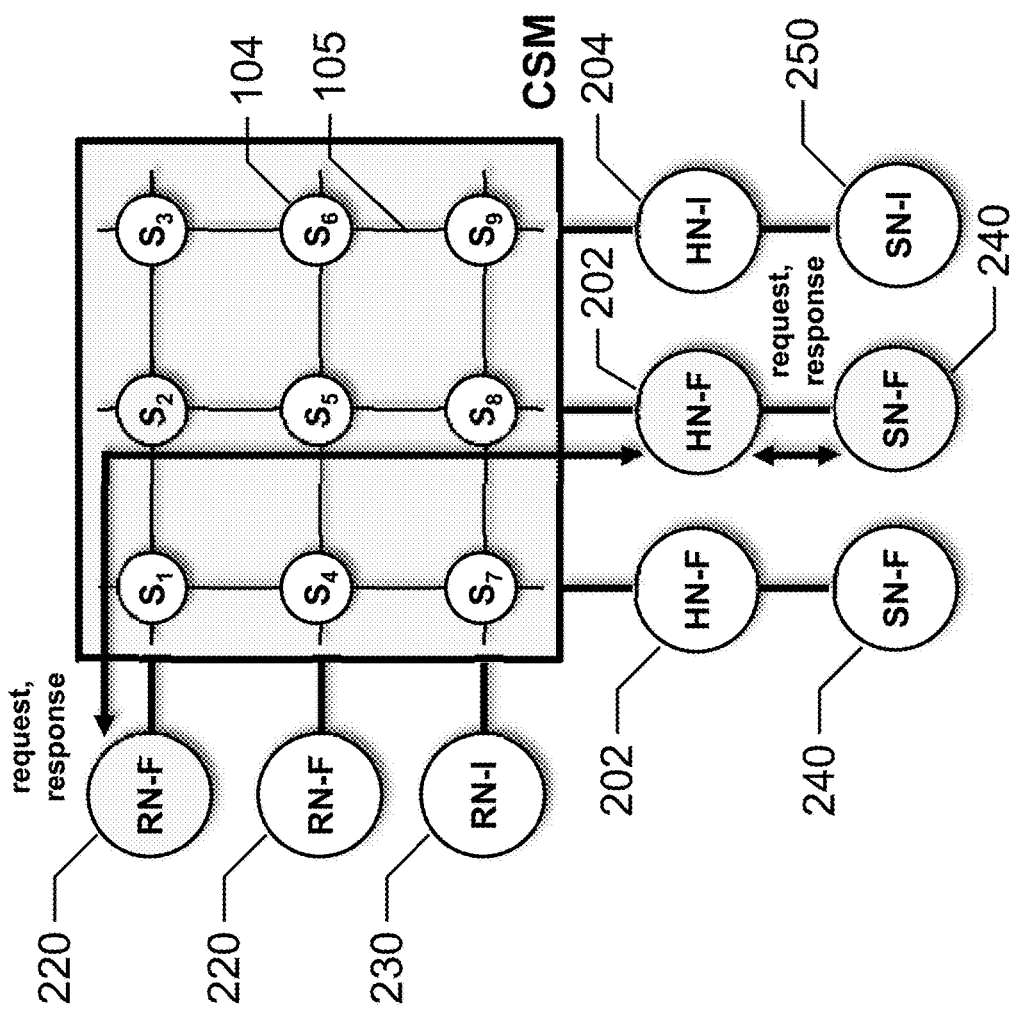
FIGS. 3A, 3B and 3C depict different topologies for an interconnect, in accordance with embodiments of the present disclosure.

FIG. 3A depicts interconnect 111 which has a crossbar topology that is configured to directly connect a pair of protocol nodes to exchange requests and responses. Interconnect 111 includes a crossbar switch matrix, CSM, which connects RN-Fs 220 and RN-I 230 to HN-Fs 202 and HN-I 204. CSM includes nine switches 104, 51 to S9, and connections 105 between adjacent switches 104. Each connection 105 includes a sufficient number of wires to support the channels over which the requests and responses are conveyed. RN-Fs 220, RN-I 230, HN-Fs 202 and HN-I 204 are directly connected to CSM, and each SN-F 240 is directly connected to an associated HN-F 202. SN-I 250 is directly connected to HN-I 204.

For example, to exchange requests and responses between the first RN-F 220 and the second HN-F 202, switch S2 is closed. As noted above, the second HN-F 202 is directly connected to the second SN-F 240. Only a single path between a pair of protocol nodes is configured at one time in each CSM. The relevant elements and paths are highlighted in FIG. 3A.

Figure 3B:
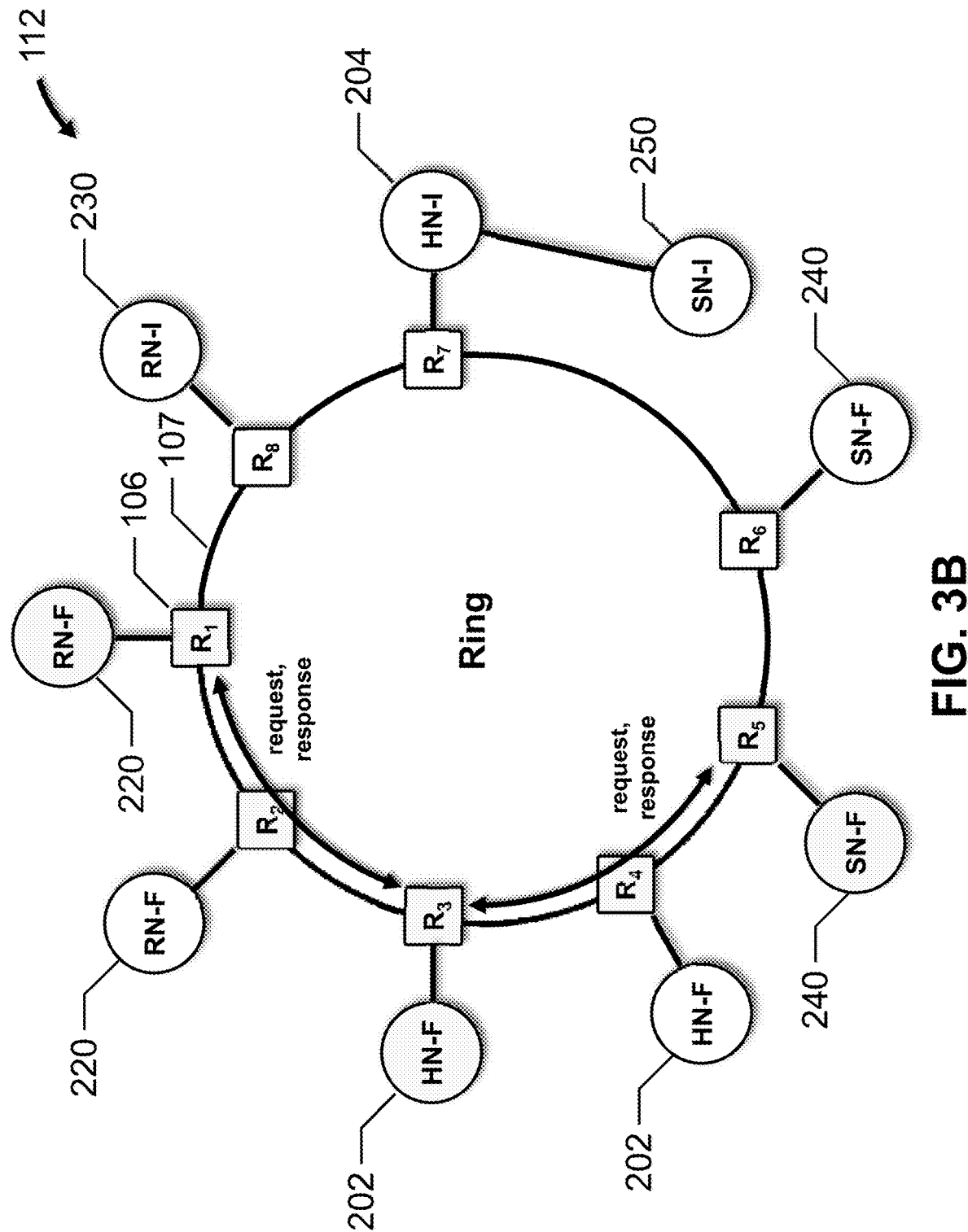

FIG. 3B depicts interconnect 112 which has a ring topology that is configured to connect all of the protocol nodes except SN-I 250. The ring has eight routers 106, R1 to R8, and connections 107 between adjacent routers 106. Each connection 107 includes a sufficient number of wires to support the channels over which the requests and responses are conveyed. The first RN-F 220 is connected to router R1, the second RN-F 220 is connected to router R2, RN-I 230 is connected to router R8, the first HN-F 202 is connected to router R3, the second HN-F 202 is connected to router R4, HN-I 204 is connected to router R7, the first SN-F 240 is connected to router R5, and the second SN-F 240 is connected to router R6. SN-I 250 is directly connected to HN-I 204.

For example, to exchange requests and responses between the first RN-F 220 and the first HN-F 202, the messages are passed through routers R1, R2, and R3, and to exchange requests and responses between the first HN-F 202 and the first SN-F 240, the messages are passed between routers R3, R4, and R5. In the ring topology, multiple requests and responses may be flowing around the ring network at one time. The relevant elements and paths are highlighted in FIG. 3B.

Figure 3C:
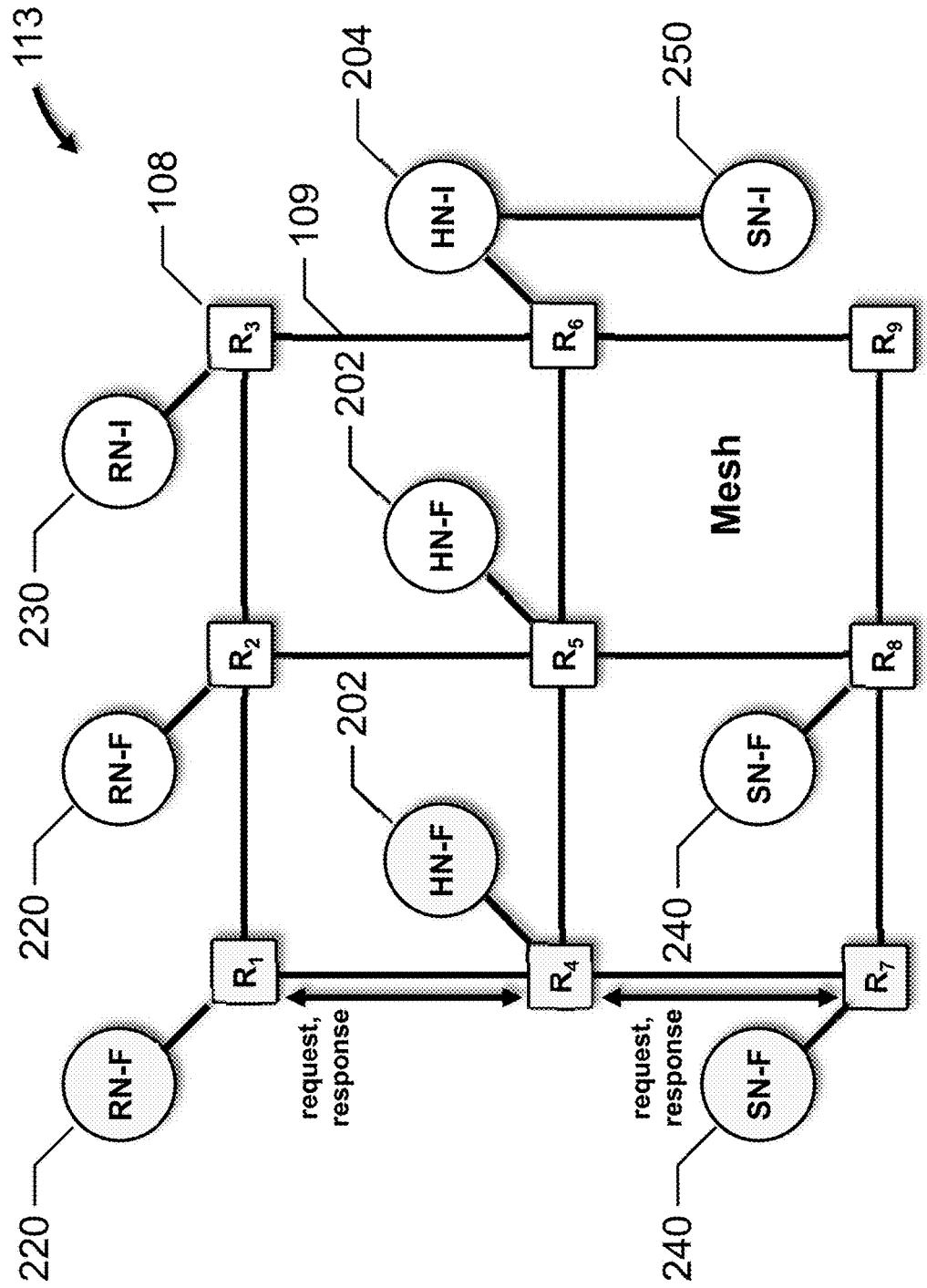

FIG. 3C depicts interconnect 112 which has a mesh topology that is configured to connect all of the protocol nodes except SN-I 250. The mesh has nine routers 108, R1 to R9, and connections 109 between adjacent routers 108. Each connection 109 includes a sufficient number of wires to support the channels over which the requests and responses are conveyed. The first RN-F 220 is connected to router R1, the second RN-F 220 is connected to router R2, RN-I 230 is connected to router R3, the first HN-F 202 is connected to router R4, the second HN-F 202 is connected to router R5, HN-I 204 is connected to router R6, the first SN-F 240 is connected to router R7, the second SN-F 240 is connected to router R8. SN-I 250 is directed connected to HN-I 204; router R9 is not connected to a protocol node in this embodiment.

For example, to exchange requests and responses between the first RN-F 220 and the first HN-F 202, the messages are passed through routers R1 and R4, and to exchange requests and responses between the first HN-F 202 and the first SN-F 240, the messages are passed between routers R4 and R7. In the mesh topology, multiple requests and responses may be flowing through the mesh network at one time. The relevant elements and paths are highlighted in FIG. 3C.

Embodiments of the present disclosure advantageously provide configurable multi-tiered interconnect resource allocation that satisfies each requester's requirements while optimizing overall system resource usage under different requester workload and contention scenarios. More particularly, configurable multi-tiered interconnect resource allocation is based on traffic class identifiers and a multi-tier bandwidth management scheme in which resources are allocated differently in pre-contention and contention situations. The traffic class identifiers are determined by mapping one or more transaction attributes to a traffic class based on a user configuration, and the configurable multi-tiered interconnect resource allocation is applied to the HNs.

For example, an HN's configurable multi-tiered resource allocation may support "N" traffic classes. Traffic classes are mapped based on one or more transaction attributes such as, for example, QoS, Opcode, memory partitioning and monitoring (MPAM), RN type (i.e., local RNs or remote RNs), RN-HN affinity (e.g., based on interconnect distance), target memory type (DDR vs high bandwidth memory or HBM), etc. MPAM provides a framework for controlling shared, memory-system components that includes partitioning the performance resources of shared, memory-system components to improve the performance of programs running on a SoC affected by the memory-system responsiveness.

In certain embodiments, a single transaction attribute may be mapped to different traffic classes.

FIG. 4A depicts several traffic class mappings for an interconnect, in accordance with embodiments of the present disclosure.

Table 310 depicts QoS-based traffic class mapping according to one embodiment. QoS values of 0, 1, 2, 3, 4, 5, 6 and 7 are mapped to traffic class 0, QoS values of 8, 9, 10 and 11 are mapped to traffic class 1, QoS values of 12, 13 and 14 are mapped to traffic class 2, a QoS value of 15 is mapped to traffic class 3, etc. Other embodiments may include fewer traffic classes, more traffic classes, different QoS mappings, etc.

Table 320 depicts Opcode-based traffic class mapping according to one embodiment. A "READ" Opcode is mapped to traffic class 0, a "COPYBACK" Opcode is mapped to traffic class 1, a "NON-COPYBACK" Opcode is mapped to traffic class 2, a "DATALESS/CMO" Opcode is mapped to traffic class 3 where CMO represents a cache memory operation, etc. Other embodiments may include fewer traffic classes, more traffic classes, different Opcode mappings, etc.

Table 330 depicts MPAM-based traffic class mapping according to one embodiment. MPAM values may represent partition identifiers (i.e., PARTIDs). MPAM values between (and including) 0 to 31 are mapped to traffic class 0, MPAM values between (and including) 32 to 63 are mapped to traffic class 1, MPAM values between (and including) 64 to 127 are mapped to traffic class 2, MPAM values between (and including) 128 to 511 are mapped to traffic class 3, etc. Other embodiments may include fewer traffic classes, more traffic classes, different MPAM mappings, etc.

In many embodiments, multiple transaction attributes may be mapped to different traffic classes in a hierarchical manner.

FIG. 4B depicts a hierarchical traffic class mapping for an interconnect, in accordance with an embodiment of the present disclosure.

Table 340 combines the traffic classes (or subclasses) provided in Tables 310, 320 and 330 into a hierarchical traffic class mapping that includes 64 traffic classes. In the hierarchy, QoS mapping is senior to Opcode mapping, and Opcode mapping is senior to MPAM mapping. For example, QoS traffic subclass 0 is mapped to the first 16 traffic classes (i.e., traffic classes 0 to 15), Opcode traffic subclass 0 is mapped to a traffic class within one of 4 traffic class ranges (i.e., traffic classes 0 to 3, 16 to 19, 32 to 35, and 48 to 51), and MPAM traffic subclass 0 is mapped to every fourth traffic class (i.e., traffic classes 0, 4, 8, 12, 16, 20, 24, 28, 32, 36, 40, 44, 48, 52, 56 and 60).

In these embodiments, traffic class 0 is the highest priority traffic class or subclass.

Figure 5:
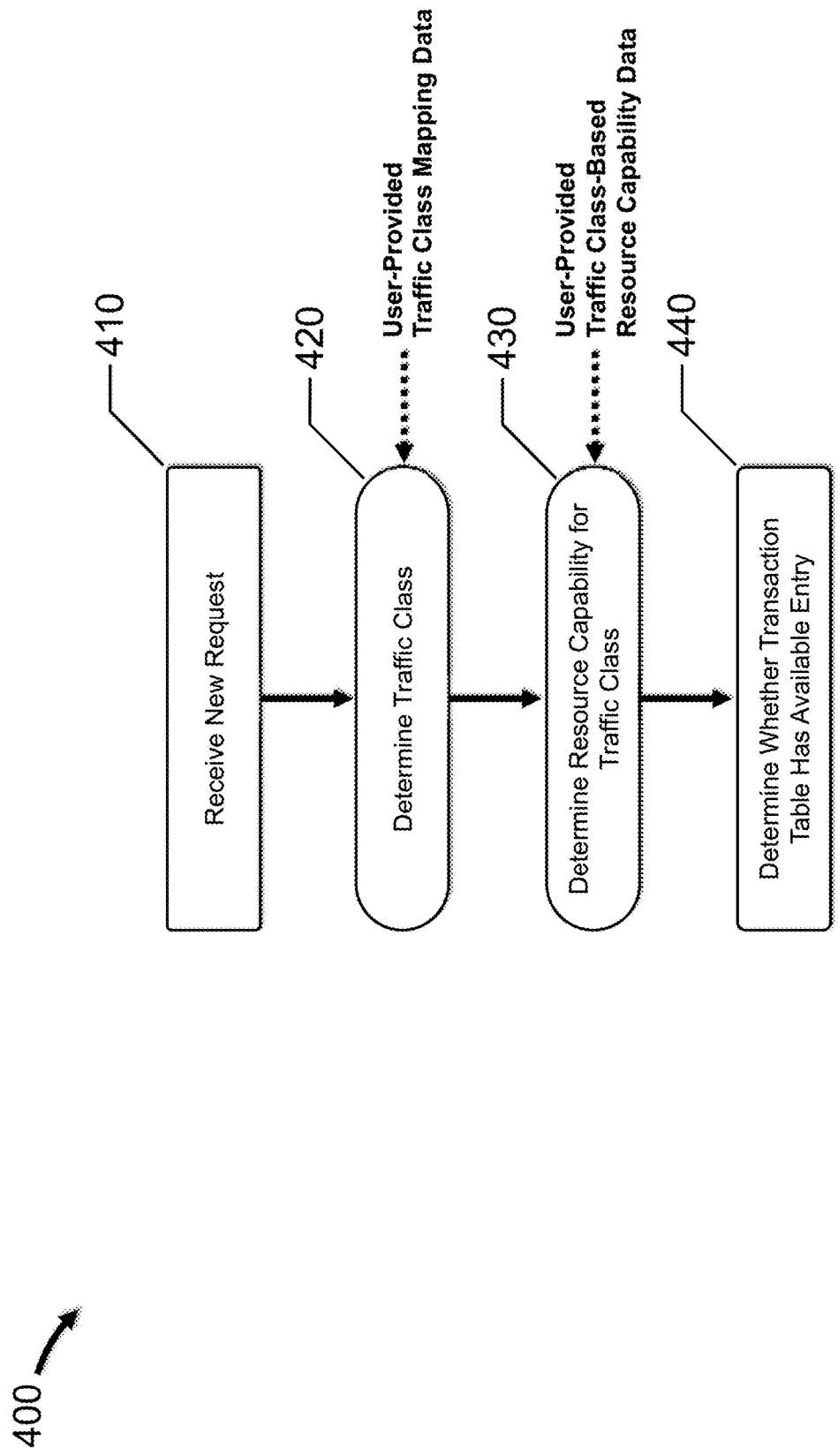
FIG. 5 depicts a flow diagram for traffic class-based resource allocation, in accordance with an embodiment of the present disclosure.

FIG. 5 depicts a flow diagram 400 for traffic class-based resource allocation, in accordance with an embodiment of the present disclosure. Generally, flow diagram 400 presents a method for allocating shared resources for an interconnect.

At 410, a request is received at an HN over an interconnect. The request represents the beginning of a new transaction with a resource, managed by the HN, that is initiated by an RN or a master device coupled to the RN. The transaction generally includes the request from the RN and a response from the HN, and, as discussed below, may also include a retry response from the HN and a retried request from the RN during certain conditions. When the RN receives a transaction initiated by a master device, the RN creates the request based on this transaction.

At 420, the traffic class of the request is determined based on traffic class mapping data provided by a user. For example, using a hierarchical traffic class mapping based on Tables 310, 320, 330 and 340 provided by the user, a request that has a QoS of 0, a READ Opcode, and an MPAM of 0 is mapped to QoS subclass 0, Opcode subclass 0, MPAM subclass 0, and traffic class 0.

At 430, the resource capability for the traffic class of the request is determined based on traffic class-based resource capability data provided by the user. For example, the user may specify that a particular HN may allocate up to 50% of the available entries in its transaction table for traffic class 0 when there is no contention for the resource by other traffic classes.

At 440, whether the HN's transaction table has an empty slot or available entry for the request is determined based on the traffic class-based resource capability data. If so, the available entry in the transaction table is allocated to the request for subsequent processing by the HN and its associated resource. After the HN processes the request, a response is sent to the RN over the interconnect. The response represents the end of the transaction.

Advantageously, traffic class-based resource allocation provides flexibility by identifying different resources for allocation based on user provided data, and improves the performance of unique SoC component workload scenarios.

As discussed above, the configurable multi-tiered resource allocation scheme allocates resources differently in contention and non-contention situations. In a non-contention situation, requests from RNs with a particular traffic class are not contending with requests from RNs with other traffic classes for an HN's resource, and the particular traffic class may be allocated up to a maximum number of entries in the HN's transaction table (i.e., a "max allowed" parameter). Once the max allowed parameter is reached for a particular traffic class, any incoming request for that traffic class is retried (i.e., a retry response is sent to the requester, which waits unit a credit grant is subsequently received before sending a retried request) even if there are available entries in the HN's transaction table. The max allowed parameter ensures that a particular traffic class does not overwhelm the resource, and that there are enough available entries in the HN's transaction table to service all of the traffic classes.

When a shared resource is busy when a request arrives at the HN, the resource is considered to be "contended," and the process transitions from the non-contention situation to the contention situation. In such cases, the request is retried and allocated at a later time.

In a contention situation, requests from RNs with different traffic classes are contending with each other for the HN's resource, and each traffic class is first allocated a minimum number of entries in the HN's transaction table (i.e., a "contended min" parameter). The contended min parameter indicates a desired number of entries for a traffic class during contention. While these entries are not reserved, requests with a traffic class that is currently allocated below its contended min parameter are given higher priority than requests with a traffic class that is currently allocated above its contended min parameter. In other words, the contended min parameter ensures that a particular bandwidth distribution is guaranteed across traffic classes during contention.

Once the number of allocated requests for each traffic class equals the respective contended min parameters, a weighted round robin arbitration process allocates additional entries in the HN's transaction table across the contending traffic classes to achieve a desired bandwidth shaping.

In addition to the max allowed and contended min parameters, the user may specify a minimum number of entries in the HN's transaction table for each traffic class (i.e., a "dedicated" parameter), and a "weight" parameter for each traffic class. The dedicated parameter indicates the number of entries in HN's transaction table that are reserved for a particular traffic class at all times. These entries are used exclusively by the traffic class to ensure that a minimum bandwidth is provided for the traffic class, which avoids latency when requests arrive during contention. The weight parameter is used by the weighted round robin arbitration process during contention. The weight parameter indicates a more preferred allocation, e.g., 1 indicates a low preference and 8 indicates a high preference; any relative weight scale may be used.

Figure 6:
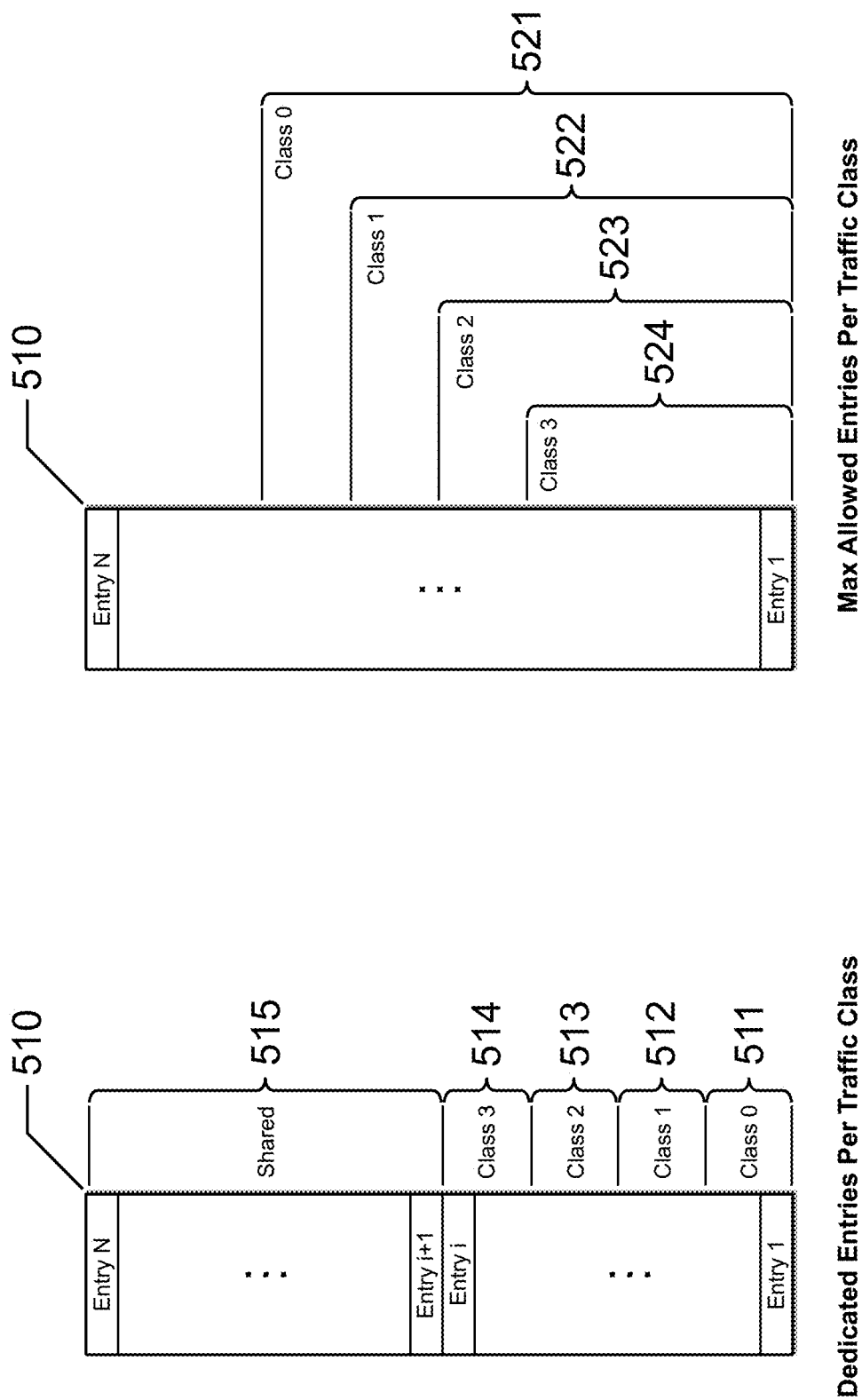
FIGS. 6A and 6B depict block diagrams of transaction table for a shared resource, in accordance with embodiments of the present disclosure.

FIGS. 6A and 6B depict block diagrams of transaction table 510 for a shared resource, in accordance with embodiments of the present disclosure.

For purposes of illustration, four traffic classes are depicted, and transaction table 510 includes N entries. FIG. 6A depicts the dedicated entries per traffic class (i.e., the dedicated parameter), while FIG. 6B depicts the max allowed entries per traffic class (i.e., the max allowed parameter). Traffic class 0 has been apportioned dedicated entries 511 and max allowed entries 521, traffic class 1 has been apportioned dedicated entries 512 and max allowed entries 522, traffic class 2 has been apportioned dedicated entries 513 and max allowed entries 523, and traffic class 3 has been apportioned dedicated entries 514 and max allowed entries 524. The remaining entries have been apportioned to shared entries 515, i.e., entry i+1 to entry N.

In many embodiments, the total number of dedicated entries is less than the total number of entries, N, the max allowed parameter for any traffic class is less than or equal to the total number of entries, N, and, for any traffic class, the max allowed parameter is greater than the contended min parameter which is greater than the dedicated parameter.

For example, with respect to Table 810 discussed below, the number of dedicated entries 511 equals 4, the number of dedicated entries 512 equals 4, the number of dedicated entries 513 equals 2, the number of dedicated entries 514 equals 4, the number of max allowed entries 521 equals 16, the number of max allowed entries 522 equals 20, the number of max allowed entries 523 equals 16, and the number of max allowed entries 524 equals 24. The number of entries, N, equals 32, the total number of dedicated entries equals 14, and the number of shared entries 515 equals 18.

Generally, a request with a traffic class that has a total number of allocated entries that is less than its dedicated parameter is allocated an entry in the HN's transaction table. During the non-contention situation, a request with a traffic class that has a total number of allocated entries that is less than its max allowed parameter is allocated an entry if a shared entry 515 is available in the HN's transaction table. During the contention situation, a retried request with a traffic class that has a total number of allocated entries that is below its dedicated parameter will be allocated a credit grant, and, a retried request with a traffic class that has a total number of allocated entries that is below its contended min parameter will be allocated a credit grant. If there are retried requests with multiple traffic classes, a simple round robin arbitration process may be used to allocate the credit grants in either case. Once the number of retried requests for each traffic class equals the respective contended min parameter, the weighted round robin arbitration process allocates the credit grants.

Figure 7:
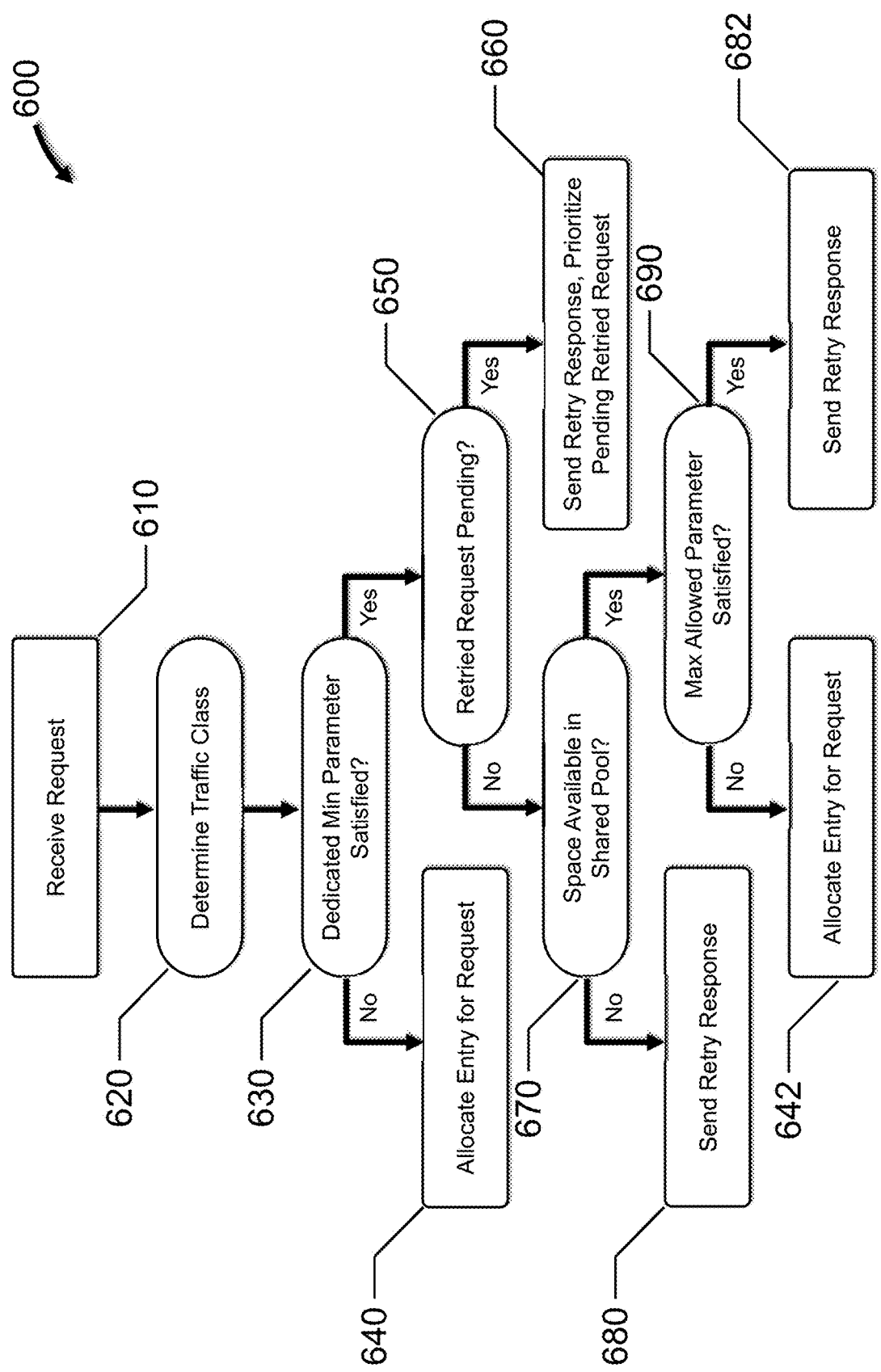
FIG. 7 depicts a flow diagram for allocating a request at a home node of an interconnect, in accordance with an embodiment of the present disclosure.

FIG. 7 depicts a flow diagram 600 for allocating a request at an HN of an interconnect, in accordance with an embodiment of the present disclosure. Generally, flow diagram 600 presents a method for allocating shared resources for an interconnect. The HN will allocate an entry in the HN's transaction table for the request if the constraints are satisfied, and issue a retry response to the RN if the constraints are not satisfied.

At 610, a request is received at an HN over an interconnect. The request represents the beginning of a new transaction with a resource, managed by the HN, that is initiated by an RN or a master device coupled to the RN. The transaction generally includes the request from the RN and a response from the HN, and, as discussed below, may also include a retry response from the HN and a retried request from the RN during certain conditions. When the RN receives a transaction initiated by a master device, the RN creates the request based on this transaction.

At 620, the traffic class of the request is determined based on traffic class mapping data provided by a user, such as, for example, traffic class 0, traffic class 1, traffic class 2, traffic class 3, etc. As discussed above, a single transaction attribute may be mapped to different traffic classes (e.g., Tables 310, 320 and 330), or multiple transaction attributes may be mapped to different traffic classes in a hierarchical manner (e.g., Table 340).

At 630, the total number of allocated entries for the traffic class is determined and compared to the dedicated parameter of the traffic class (e.g., dedicated entries 511, 512, 513, 541). When the total number of allocated entries for the traffic class is less than the dedicated parameter of the traffic class, the dedicated parameter is not satisfied and flow proceeds to 640. Otherwise, the dedicated parameter is satisfied and flow proceeds to 650.

At 640, an available entry in transaction table 510 is allocated to the request for subsequent processing by the HN and its associated resource.

At 650, the existence of one or more pending retried requests for this traffic class is determined. As described above, when the HN is unable to allocate an entry in its transaction table for a request, the HN sends a retry response to the RN. The RN then waits for authorization from the HN before sending the request back to the HN as a retried request. When there are pending retried requests for this traffic class (i.e., retried requests that have not been received), flow proceeds to 660; otherwise flow proceeds to 670.

At 660, the HN sends a retry response to the RN, and prioritizes the processing of the pending retried requests.

At 670, the existence of space in the shared pool is determined. In other words, the existence of an available entry in shared entries 515 of transaction table 510 is determined. When an entry is not available in shared entries 515, flow proceeds to 680; otherwise flow proceeds to 690.

At 680, the HN sends a retry response to the RN.

At 690, the total number of allocated entries for the traffic class is determined and compared to the max allowed parameter of the traffic class. When the total number of allocated entries for the traffic class is less than the max allowed parameter of the traffic class, the max allowed parameter is not satisfied and flow proceeds to 642. Otherwise, the max allowed parameter is satisfied and flow proceeds to 682.

At 642, an available entry in transaction table 510 is allocated to the request for subsequent processing by the HN and its associated resource.

At 682, the HN sends a retry response to the RN over the interconnect.

Generally, flow diagram 600 depicts a more detailed embodiment of flow diagram 400.

Figure 8:
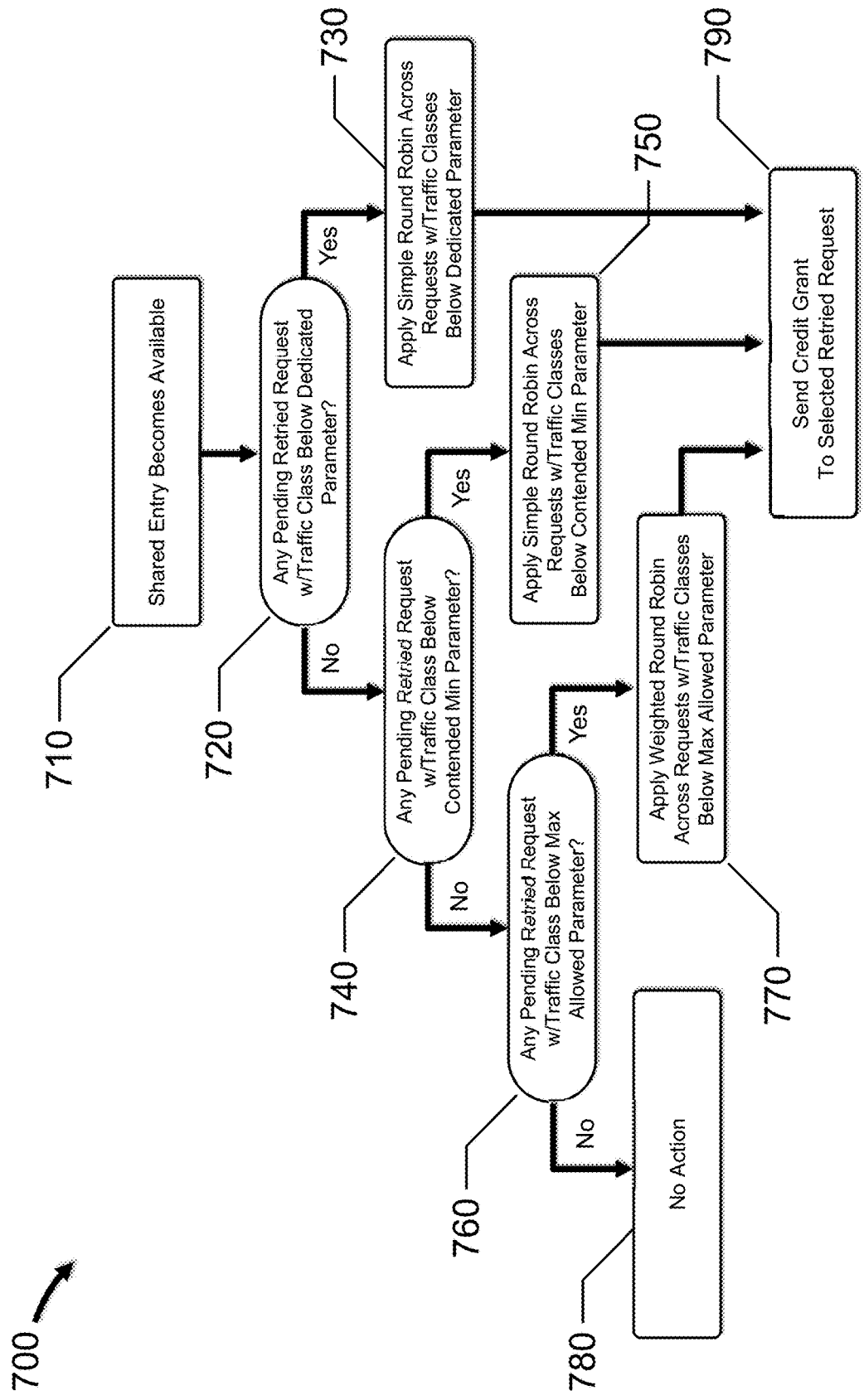
FIG. 8 depicts a flow diagram for granting credits for retried requests over an interconnect, in accordance with an embodiment of the present disclosure.

FIG. 8 depicts a flow diagram 700 for granting credits for retried requests over an interconnect, in accordance with an embodiment of the present disclosure. Generally, flow diagram 700 presents a method for allocating shared resources for an interconnect, and may be combined with flow diagram 600.

At 710, a shared entry 515 in transaction table 510 is determined to be available.

At 720, the existence of pending retried requests for traffic classes that have a total number of allocated entries below the dedicated parameter is determined. When two or more traffic classes have a pending retried request and a total number of allocated entries below its dedicated parameter, flow proceeds to 730; otherwise, flow proceeds to 750.

At 730, a simple round robin arbitration based on traffic class is applied to determine which pending retried request and associated RN will receive a credit grant from those traffic classes that have a total number of allocated entries below its dedicated parameter (i.e., the "selected" pending retried request). Flow proceeds to 790.

At 740, the existence of any pending retried requests for traffic classes that have a total number of allocated entries below the contended min parameter is determined. When one or more traffic classes have a pending retried request and a total number of allocated entries below its contended min parameter, flow proceeds to 750; otherwise, flow proceeds to 760.

At 750, a simple round robin arbitration is applied to determine which retried request and associated RN (i.e., the "winning" RN) will receive a credit grant from those traffic classes that have a total number of allocated entries below its contended min parameter. Flow proceeds to 790.

At 760, the existence of any pending retried requests for traffic classes that have a total number of allocated entries below the max allowed parameter is determined. When one or more traffic classes have a pending retried request and a total number of allocated entries below its max allowed parameter, flow proceeds to 770; otherwise, flow proceeds to 780.

At 770, a simple round robin arbitration is applied to determine which retried request and associated RN (i.e., the "winning" RN) will receive a credit grant from those traffic classes that have a total number of allocated entries below its max allowed parameter. Flow proceeds to 790.

At 780, no action is taken.

At 790, the credit grant is sent to the winning RN over the interconnect.

Figure 9:
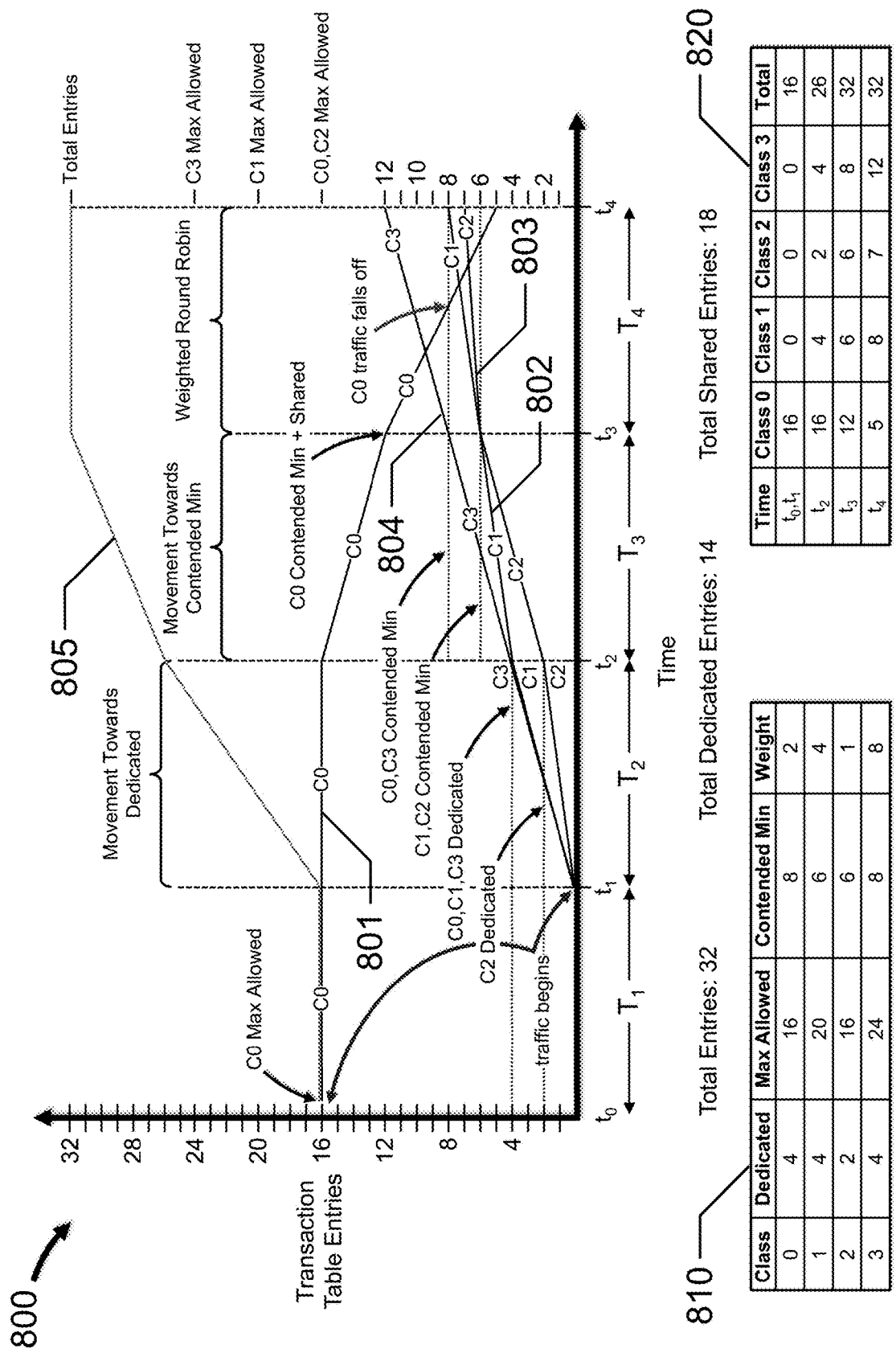
FIG. 9 depicts a graph illustrating traffic class bandwidth shaping, in accordance with embodiments of the present disclosure.

FIG. 9 depicts a graph 800 illustrating traffic class bandwidth shaping, in accordance with embodiments of the present disclosure.

Generally, graph 800 depicts the allocation of entries within an HN transaction table over time. The allocation of entries for four traffic classes are depicted, i.e., traffic class 0 (C0) allocation 801, traffic class 1 (C1) allocation 802, traffic class 2 (C2) allocation 803, traffic class 3 (C3) allocation 804 as well as the total allocations 805, and four time periods are depicted, i.e., $T_1$, $T_2$, $T_3$ and $T_4$. Time period $T_1$ begins at $t_0$ and ends at $t_1$, time period $T_2$ begins at $t_1$ and ends at $t_2$, time period $T_3$ begins at $t_2$ and ends at $t_3$, and time period $T_4$ begins at $t_3$ and ends at $t_4$. Table 810 presents the parameters for each traffic class, i.e., the dedicated parameter, the max allowed parameter, the contended min parameter and the weight parameter. Table 820 presents the number of allocated entries for each traffic class as well as the total number of allocated entries in the transaction table at each time $t_i$, i.e., to, $t_1$, $t_2$, $t_3$, and $t_4$.

With respect to Table 810, traffic class 0 (i.e., C0) has a dedicated parameter equal to 4, a max allowed parameter equal to 16, a contended min parameter equal to 8 and a weight equal to 2. Traffic class 1 (i.e., C1) has a dedicated parameter equal to 4, a max allowed parameter equal to 20, a contended min parameter equal to 6 and a weight equal to 4. Traffic class 2 (i.e., C2) has a dedicated parameter equal to 2, a max allowed parameter equal to 16, a contended min parameter equal to 6 and a weight equal to 1. Traffic class 3 (i.e., C3) has a dedicated parameter equal to 4, a max allowed parameter equal to 24, a contended min parameter equal to 8 and a weight equal to 8. Generally, traffic class 3 has the highest weight parameter and is the most preferred with respect to weighted round robin arbitration during the contention situation, and also has the highest max allowed parameter and is the most preferred when the other traffic classes have reduced traffic. Conversely, traffic class 2 has the lowest weight parameter and is the least preferred with respect to weighted round robin arbitration during the contention situation, and also has the lowest max allowed parameter and is the least preferred when the other traffic classes have reduced traffic.

With respect to Table 820, at time $t_0$, traffic class 0 has 16 allocated entries in the HN transaction table, traffic classes 1, 2 and 3 have 0 allocated entries, and the total number of allocated entries is 16. Similarly, at time $t_1$, traffic class 0 has 16 allocated entries, traffic classes 1, 2 and 3 have 0 allocated entries, and the total number of allocated entries is 16. At time $t_2$, traffic class 0 has 16 allocated entries, traffic classes 1 and 3 have 4 allocated entries, traffic class 2 has 2 allocated entries, and the total number of allocated entries is 26. At time $t_3$, traffic class 0 has 12 allocated entries, traffic classes 1 and 2 have 6 allocated entries, traffic class 3 has 8 allocated entries, and the total number of allocated entries is 32. At time $t_4$, traffic class 0 has 5 allocated entries, traffic class 1 has 8 allocated entries, traffic class 2 has 7 allocated entries, traffic class 3 has 12 allocated entries, and the total number of allocated entries is 32.

At the beginning of time period $T_1$ (i.e., to), traffic begins to flow for traffic class 0, i.e., requests with a traffic class of 0 are received from one or more RNs over the interconnect. Due to the absence of requests with a traffic class of 1, 2 and 3, traffic class 0 is allocated a number of entries equal to its max allowed parameter, i.e., 16 entries, and the total number of allocated entries in the transaction table is 16. At the end of time period $T_1$ (i.e., $t_1$), traffic class 0 has retained its allocation of 16 entries due to its continued traffic flow and the absence of requests with a traffic class of 1, 2 or 3, and the total number of allocated entries in the transaction table is 16. There is no contention during time period $T_1$.

At the beginning of time period $T_2$ (i.e., $t_1$), traffic continues to flow for traffic class 0, and traffic begins to flow for traffic classes 1, 2 and 3, i.e., requests with a traffic class of 0, 1, 2 and 3 are received from one or more RNs over the interconnect. During time period $T_2$, requests with a traffic class of 1, 2 and 3 are slowly arriving and each traffic class is allocated its respective number of dedicated entries, which advantageously provides a minimum guaranteed entry latency for these traffic classes. At the end of time period $T_2$ (i.e., $t_2$), the traffic flows for traffic classes 1, 2 and 3 have met their respective number of dedicated entries and are continuing to increase, while traffic class 0 has retained its allocation of 16 entries due to its continued traffic flow and relatively small number of requests with traffic classes of 1, 2 and 3. Traffic class 0 has retained its allocation of 16 entries, traffic class 1 has an allocation of 4 entries, traffic class 2 has an allocation of 2 entries, traffic class 3 has an allocation of 4 entries, and the number of shared entries that have not been allocated is 6. Generally, there is no contention during time period $T_2$, and the allocation of entries for traffic classes 1, 2, and 3 are moving towards their respective dedicated parameters.

At the beginning of time period $T_3$ (i.e., $t_2$), traffic continues to flow for traffic classes 0, 1, 2 and 3, i.e., requests with a traffic class of 0, 1, 2 and 3 are received from one or more RNs over the interconnect. Due to the increased traffic flow from traffic classes 1, 2 and 3, contention is likely, so the allocation of entries for traffic classes 0, 1, 2, and 3 begin moving towards their respective contended min parameters. At the end of time period $T_3$ (i.e., $t_3$), the traffic flows for traffic classes 1, 2 and 3 have met their respective number of contended min entries and are continuing to increase, while traffic class 0 has reduced its allocation to 12 entries due to its continued traffic flow and the increasing number of requests with traffic classes of 1, 2 and 3 (i.e., its contended min of 8 entries plus 4 shared entries). Traffic class 1 has an allocation of 6 entries, traffic class 2 has an allocation of 6 entries, traffic class 3 has an allocation of 8 entries, and the number of shared entries that have not been allocated is 0 (i.e., all 32 entries have been allocated). Generally, there is no contention during time period $T_3$.

At the beginning of time period $T_4$ (i.e., $t_3$), traffic continues to flow for traffic classes 0, 1, 2 and 3, i.e., requests with a traffic class of 0, 1, 2 and 3 are received from one or more RNs over the interconnect. Due to the increased traffic flow from traffic classes 1, 2 and 3, there is contention, so the allocation of entries for traffic classes 0, 1, 2, and 3 begin at their respective contended min parameters and generally increase based on a weighted round robin allocation. However, the traffic flow for traffic class 0 falls during time period $T_4$, and only requires an allocation of 5 entries by the end of time period $T_4$, which frees up 3 entries for allocation to traffic classes 1, 2 and 3.

The weighted round robin allocation is based on the weight parameter for each traffic class. Traffic class 3 has a weight parameter of 8, and has received an increased in allocation from 8 entries to 12 entries. Traffic class 2 has a weight parameter of 1, and has received an increased in allocation from 6 entries to 7 entries. Traffic class 1 has a weight parameter of 4, and has received an increased in allocation from 6 entries to 8 entries. Generally, the respective increase in the allocation for each traffic class is proportional to its respective weight parameter. At the end of time period $T_4$ (i.e., $t_4$), the traffic flows for traffic classes 1, 2 and 3 have met their respective weighted round robin allocations.

Advantageously, when traffic classes are contending for entries in the transaction table, the traffic classes will reach their respective contended min parameter with equal priority, and then the traffic class weight parameters will determine the allocation of entries within the transaction table.

The embodiments described above and summarized below are combinable.

In one embodiment, a method for allocating shared resources for an interconnect includes receiving, at a home node, a request from a request node over an interconnect, the request representing a beginning of a transaction with a resource in communication with the home node, the request having a traffic class defined by a user-configurable mapping based on one or more transaction attributes; determining the traffic class of the request; determining a resource capability for the traffic class based on user configurable traffic class-based resource capability data; and determining whether a home node transaction table has an available entry for the request based on the resource capability for the traffic class.

In another embodiment of the method, the method further comprises allocating an entry in the home node transaction table based on said determining whether the home node transaction table has an available entry for the request; processing the request; generating a response based on said processing the request, the response representing an end of the transaction; and sending the response to the request node over the interconnect.

In another embodiment of the method, the user-configurable mapping defines a plurality of traffic classes that are mapped to a plurality of transaction attributes in a hierarchical manner; each transaction attribute has a plurality of values that are mapped to a plurality of transaction attribute traffic subclasses; each transaction attribute traffic subclass is mapped to a plurality of traffic classes; and the transaction attributes include at least one of a Quality of Service (QoS) mapped to a plurality of QoS traffic subclasses, an operation code (Opcode) mapped to a plurality of Opcode traffic subclasses, and a memory partitioning and monitoring (MPAM) mapped to a plurality of MPAM traffic subclasses.

In another embodiment of the method, the user configurable traffic class based resource capability data includes, for each traffic class, a dedicated parameter that indicates a number of entries that are reserved in the home node transaction table for the traffic class at all times; a max allowed parameter that indicates a maximum number of allocatable entries in the home node transaction table for the traffic class; a contended min parameter that indicates a desired number of entries in the home node transaction table for the traffic class during contention; and a weight parameter for the traffic class for a weighted round robin arbitration.

In another embodiment of the method, said determining a resource capability for the traffic class includes determining a total number of allocated entries for the traffic class in the home node transaction table; said determining whether the home node transaction table has an available entry for the request includes comparing the total number of allocated entries to the dedicated parameter of the traffic class; and the method further comprises when the total number of allocated entries for the traffic class is less than the dedicated parameter of the traffic class, allocating an entry in the home node transaction table to the request.

In another embodiment of the method, when the total number of allocated entries for the traffic class in the home node transaction table is greater than or equal to the dedicated parameter of the traffic class, determining a resource capability for the traffic class further includes determining whether one or more pending retried requests exist for the traffic class; and the method further comprises when one or more pending retried requests exist for the traffic class, sending a retry response to the request node over the interconnect.

In another embodiment of the method, when one or more pending retried requests for the traffic class do not exist, determining whether the home node transaction table has an available entry for the request includes determining whether a shared entry exists in the home node transaction table; and the method further comprises when a shared entry exists in the home node transaction table, comparing the total number of allocated entries to the max allowed parameter of the traffic class; and, when the total number of allocated entries for the traffic class is less than the max allowed parameter of the traffic class, allocating an entry in the home node transaction table to the request.

In another embodiment of the method, the method further comprises when the total number of allocated entries for the traffic class is equal to the max allowed parameter of the traffic class, sending a retry response to the request node over the interconnect.

In another embodiment of the method, the method further comprises determining that a shared entry in the home node transaction table is available; determining whether two or more traffic classes have pending retried requests and whether each traffic class has a total number of allocated entries in the home node transaction table that is less than the dedicated parameter for the traffic class; when two or more traffic classes have pending retried requests and each traffic class has a total number of allocated entries in the home node transaction table that is less than the dedicated parameter for the traffic class, applying a round robin allocation across the traffic classes to select a pending retried request to receive a credit grant; and sending the credit grant to the request node from which the selected pending retried request originated.

In another embodiment of the method, the method further comprises when two or more traffic classes have pending retried requests and each traffic class has a total number of allocated entries in the home node transaction table that is greater than or equal to the dedicated parameter for the traffic class, determining whether each traffic class has a total number of allocated entries in the home node transaction table that is less than the contended min parameter for the traffic class; when each traffic class has a total number of allocated entries in the home node transaction table that is less than the contended min parameter for the traffic class, applying a round robin allocation across the traffic classes to select a pending retried request to receive a credit grant; and sending the credit grant to the request node from which the selected pending retried request originated.

In another embodiment of the method, the method further comprises when two or more traffic classes have pending retried requests and each traffic class has a total number of allocated entries in the home node transaction table that is greater than or equal to the contended min parameter for the traffic class, determining whether each traffic class has a total number of allocated entries in the home node transaction table that is less than the max allowed parameter for the traffic class; when each traffic class has a total number of allocated entries in the home node transaction table that is less than the max allowed parameter for the traffic class, applying a weighted round robin allocation across the traffic classes, based on weight parameters of each traffic class, to select a pending retried request to receive a credit grant; and sending the credit grant to the request node from which the selected pending retried request originated.

In one embodiment, a system includes an interconnect; a request node including a request node processor coupled to the interconnect; and a home node including a home node processor coupled to the interconnect, and the home node processor is configured to receive a request from the request node over the interconnect, the request representing a beginning of a transaction with a resource in communication with the home node, the request having a traffic class defined by a user-configurable mapping based on one or more transaction attributes, determine a traffic class of the request, determine a resource capability for the traffic class based on user configurable traffic class-based resource capability data, and determine whether a home node transaction table has an available entry for the request based on the resource capability for the traffic class.

In another embodiment of the system, the user configurable traffic class based resource capability data includes, for each traffic class, a dedicated parameter that indicates a number of entries that are reserved in the home node transaction table for the traffic class at all times; a max allowed parameter that indicates a maximum number of allocatable entries in the home node transaction table for the traffic class; a contended min parameter that indicates a desired number of entries in the home node transaction table for the traffic class during contention; and a weight parameter for the traffic class for a weighted round robin arbitration.

In another embodiment of the system, determine a resource capability for the traffic class includes determine a total number of allocated entries for the traffic class in the home node transaction table; determine whether the home node transaction table has an available entry for the request includes compare the total number of allocated entries to the dedicated parameter of the traffic class; and the home node processor is further configured to, when the total number of allocated entries for the traffic class is less than the dedicated parameter of the traffic class, allocate an entry in the home node transaction table to the request.

In another embodiment of the system, when the total number of allocated entries for the traffic class in the home node transaction table is greater than or equal to the dedicated parameter of the traffic class, determine a resource capability for the traffic class further includes determine whether one or more pending retried requests exist for the traffic class; and the home node processor is further configured to, when one or more pending retried requests exist for the traffic class, send a retry response to the request node over the interconnect.

In another embodiment of the system, when one or more pending retried requests for the traffic class do not exist, determine whether the home node transaction table has an available entry for the request includes determine whether a shared entry exists in the home node transaction table; and the home node processor is further configured to, when a shared entry exists in the home node transaction table, compare the total number of allocated entries to the max allowed parameter of the traffic class; and when the total number of allocated entries for the traffic class is less than the max allowed parameter of the traffic class, allocate an entry in the home node transaction table to the request.

In another embodiment of the system, when the total number of allocated entries for the traffic class is equal to the max allowed parameter of the traffic class, the home node processor is further configured to send a retry response to the request node over the interconnect.

In another embodiment of the system, the home node processor is further configured to determine that a shared entry in the home node transaction table is available; determine whether two or more traffic classes have pending retried requests and whether each traffic class has a total number of allocated entries in the home node transaction table that is less than the dedicated parameter for the traffic class; when two or more traffic classes have pending retried requests and each traffic class has a total number of allocated entries in the home node transaction table that is less than the dedicated parameter for the traffic class, the home node processor is further configured to apply a round robin allocation across the traffic classes to select a pending retried request to receive a credit grant; and send the credit grant to the request node from which the selected pending retried request originated.

In another embodiment of the system, when two or more traffic classes have pending retried requests and each traffic class has a total number of allocated entries in the home node transaction table that is greater than or equal to the dedicated parameter for the traffic class, the home node processor is further configured to determine whether each traffic class has a total number of allocated entries in the home node transaction table that is less than the contended min parameter for the traffic class; when each traffic class has a total number of allocated entries in the home node transaction table that is less than the contended min parameter for the traffic class, apply a round robin allocation across the traffic classes to select a pending retried request to receive a credit grant; and send the credit grant to the request node from which the selected pending retried request originated.

In another embodiment of the system, when two or more traffic classes have pending retried requests and each traffic class has a total number of allocated entries in the home node transaction table that is greater than or equal to the contended min parameter for the traffic class, the home node processor is further configured to determine whether each traffic class has a total number of allocated entries in the home node transaction table that is less than the max allowed parameter for the traffic class; when each traffic class has a total number of allocated entries in the home node transaction table that is less than the max allowed parameter for the traffic class, apply a weighted round robin allocation across the traffic classes, based on weight parameters of each traffic class, to select a pending retried request to receive a credit grant; and send the credit grant to the request node from which the selected pending retried request originated.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, the terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "many embodiment," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A method for allocating shared resources for an interconnect, comprising:
   receiving, at a home node, a request from a request node over an interconnect, the request representing a beginning of a transaction with a resource in communication with the home node, the request having a traffic class defined by a user-configurable mapping based on one or more transaction attributes;
   determining the traffic class of the request;

determining a resource capability for the traffic class based on user-configurable traffic class-based resource capability data; and determining whether a home node transaction table has an available entry for the request based on the resource capability for the traffic class.

2. The method according to claim 1, further comprising:

allocating an entry in the home node transaction table based on said determining whether the home node transaction table has an available entry for the request;

processing the request;

generating a response based on said processing the request, the response representing an end of the transaction; and sending the response to the request node over the interconnect.

3. The method according to claim 1, where:

the user-configurable mapping defines a plurality of traffic classes that are mapped to a plurality of transaction attributes in a hierarchical manner;

each transaction attribute has a plurality of values that are mapped to a plurality of transaction attribute traffic subclasses;

each transaction attribute traffic subclass is mapped to a plurality of traffic classes; and the transaction attributes include at least one of a Quality of Service (QoS) mapped to a plurality of QoS traffic subclasses, an operation code (Opcode) mapped to a plurality of Opcode traffic subclasses, and a memory partitioning and monitoring (MPAM) mapped to a plurality of MPAM traffic subclasses.

4. The method according to claim 1, where the user-configurable traffic class-based resource capability data includes for each traffic class:

a dedicated parameter that indicates a number of entries that are reserved in the home node transaction table for the traffic class at all times;

a max allowed parameter that indicates a maximum number of allocatable entries in the home node transaction table for the traffic class;

a contended min parameter that indicates a desired number of entries in the home node transaction table for the traffic class during contention; and a weight parameter for the traffic class for a weighted round robin arbitration.

5. The method according to claim 4, where:

said determining a resource capability for the traffic class includes determining a total number of allocated entries for the traffic class in the home node transaction table;

said determining whether the home node transaction table has an available entry for the request includes comparing the total number of allocated entries to the dedicated parameter of the traffic class; and the method further comprises:

when the total number of allocated entries for the traffic class is less than the dedicated parameter of the traffic class, allocating an entry in the home node transaction table to the request.

6. The method according to claim 5, where, when the total number of allocated entries for the traffic class in the home node transaction table is greater than or equal to the dedicated parameter of the traffic class:

said determining a resource capability for the traffic class further includes determining whether one or more pending retried requests exist for the traffic class; and the method further comprises:

when one or more pending retried requests exist for the traffic class, sending a retry response to the request node over the interconnect.

7. The method according to claim 6, where, when one or more pending retried requests for the traffic class do not exist:

said determining whether the home node transaction table has an available entry for the request includes determining whether a shared entry exists in the home node transaction table; and the method further comprises:

when a shared entry exists in the home node transaction table, comparing the total number of allocated entries to the max allowed parameter of the traffic class; and when the total number of allocated entries for the traffic class is less than the max allowed parameter of the traffic class, allocating an entry in the home node transaction table to the request.

8. The method according to claim 7, further comprising, when the total number of allocated entries for the traffic class is equal to the max allowed parameter of the traffic class:

sending a retry response to the request node over the interconnect.

9. The method according to claim 6, further comprising:

determining that a shared entry in the home node transaction table is available;

determining whether two or more traffic classes have pending retried requests and whether each traffic class has a total number of allocated entries in the home node transaction table that is less than the dedicated parameter for the traffic class;

when two or more traffic classes have pending retried requests and each traffic class has a total number of allocated entries in the home node transaction table that is less than the dedicated parameter for the traffic class:

applying a round robin allocation across the traffic classes to select a pending retried request to receive a credit grant; and sending the credit grant to the request node from which the selected pending retried request originated.

10. The method according to claim 9, further comprising when two or more traffic classes have pending retried requests and each traffic class has a total number of allocated entries in the home node transaction table that is greater than or equal to the dedicated parameter for the traffic class:

determining whether each traffic class has a total number of allocated entries in the home node transaction table that is less than the contended min parameter for the traffic class;

when each traffic class has a total number of allocated entries in the home node transaction table that is less than the contended min parameter for the traffic class:

applying a round robin allocation across the traffic classes to select a pending retried request to receive a credit grant; and sending the credit grant to the request node from which the selected pending retried request originated.

11. The method according to claim 10, further comprising when two or more traffic classes have pending retried requests and each traffic class has a total number of allocated entries in the home node transaction table that is greater than or equal to the contended min parameter for the traffic class:

determining whether each traffic class has a total number of allocated entries in the home node transaction table that is less than the max allowed parameter for the traffic class;

when each traffic class has a total number of allocated entries in the home node transaction table that is less than the max allowed parameter for the traffic class:
applying a weighted round robin allocation across the traffic classes, based on weight parameters of each traffic class, to select a pending retried request to receive a credit grant; and
sending the credit grant to the request node from which the selected pending retried request originated.

12. A system, comprising:
an interconnect;
a request node including a request node processor coupled to the interconnect; and
a home node including a home node processor coupled to the interconnect,
where the home node processor is configured to:
receive a request from the request node over the interconnect, the request representing a beginning of a transaction with a resource in communication with the home node, the request having a traffic class defined by a user-configurable mapping based on one or more transaction attributes,
determine a traffic class of the request,
determine a resource capability for the traffic class based on user configurable traffic class-based resource capability data, and
determine whether a home node transaction table has an available entry for the request based on the resource capability for the traffic class.

13. The system according to claim 12, where the user-configurable traffic class-based resource capability data includes for each traffic class:
a dedicated parameter that indicates a number of entries that are reserved in the home node transaction table for the traffic class at all times;
a max allowed parameter that indicates a maximum number of allocatable entries in the home node transaction table for the traffic class;
a contended min parameter that indicates a desired number of entries in the home node transaction table for the traffic class during contention; and
a weight parameter for the traffic class for a weighted round robin arbitration.

14. The system according to claim 13, where:
said determine a resource capability for the traffic class includes determine a total number of allocated entries for the traffic class in the home node transaction table;
said determine whether the home node transaction table has an available entry for the request includes compare the total number of allocated entries to the dedicated parameter of the traffic class; and
the home node processor is further configured to:
when the total number of allocated entries for the traffic class is less than the dedicated parameter of the traffic class, allocate an entry in the home node transaction table to the request.

15. The system according to claim 14, where, when the total number of allocated entries for the traffic class in the home node transaction table is greater than or equal to the dedicated parameter of the traffic class:
said determine a resource capability for the traffic class further includes determine whether one or more pending retried requests exist for the traffic class; and
the home node processor is further configured to:
when one or more pending retried requests exist for the traffic class, send a retry response to the request node over the interconnect.

16. The system according to claim 15, where, when one or more pending retried requests for the traffic class do not exist:
said determine whether the home node transaction table has an available entry for the request includes determine whether a shared entry exists in the home node transaction table; and
the home node processor is further configured to:
when a shared entry exists in the home node transaction table, compare the total number of allocated entries to the max allowed parameter of the traffic class; and
when the total number of allocated entries for the traffic class is less than the max allowed parameter of the traffic class, allocate an entry in the home node transaction table to the request.

17. The system according to claim 16, where, when the total number of allocated entries for the traffic class is equal to the max allowed parameter of the traffic class:
the home node processor is further configured to send a retry response to the request node over the interconnect.

18. The system according to claim 15, where the home node processor is further configured to:
determine that a shared entry in the home node transaction table is available;
determine whether two or more traffic classes have pending retried requests and whether each traffic class has a total number of allocated entries in the home node transaction table that is less than the dedicated parameter for the traffic class;
when two or more traffic classes have pending retried requests and each traffic class has a total number of allocated entries in the home node transaction table that is less than the dedicated parameter for the traffic class, the home node processor is further configured to:
apply a round robin allocation across the traffic classes to select a pending retried request to receive a credit grant; and
send the credit grant to the request node from which the selected pending retried request originated.

19. The system according to claim 18, where, when two or more traffic classes have pending retried requests and each traffic class has a total number of allocated entries in the home node transaction table that is greater than or equal to the dedicated parameter for the traffic class, the home node processor is further configured to:
determine whether each traffic class has a total number of allocated entries in the home node transaction table that is less than the contended min parameter for the traffic class;
when each traffic class has a total number of allocated entries in the home node transaction table that is less than the contended min parameter for the traffic class:
apply a round robin allocation across the traffic classes to select a pending retried request to receive a credit grant; and
send the credit grant to the request node from which the selected pending retried request originated.

20. The system according to claim 19, where, when two or more traffic classes have pending retried requests and each traffic class has a total number of allocated entries in the home node transaction table that is greater than or equal to the contended min parameter for the traffic class, the home node processor is further configured to:

determine whether each traffic class has a total number of allocated entries in the home node transaction table that is less than the max allowed parameter for the traffic class;
when each traffic class has a total number of allocated entries in the home node transaction table that is less than the max allowed parameter for the traffic class:
apply a weighted round robin allocation across the traffic classes, based on weight parameters of each traffic class, to select a pending retried request to receive a credit grant; and
send the credit grant to the request node from which the selected pending retried request originated.

\* \* \* \* \*